3,000,836
STABILIZED WHOLE BLOOD STANDARD AND METHOD OF MAKING THE SAME
Ben Ginsburg, 6010 Wilshire Blvd., Los Angeles 36, Calif.
No Drawing. Filed Sept. 2, 1958, Ser. No. 758,549
4 Claims. (Cl. 252—408)

This invention relates to a laboratory standard material and more particularly to an internal standard material to be used in the measurement of hemoglobin values of blood and a method of preparing the same.

The estimation of hemoglobin in human blood is one of the most frequently performed tests conducted in clinical laboratories. Hemoglobin is a protein and a relatively intense pigment and the majority of methods in clinical hemoglobinometry are based on the detection of the color of this pigment, or a portion of it, in the presence of relatively simple chemicals. Many different methods have been devised in hemoglobinometry to obtain analysis of the hemoglobin content of human blood from its physical or chemical characteristics. However, surveys regarding the quality of hemoglobinometry indicate generally, a very poor degree of accuracy. Since most hospitals and laboratories utilize some type of photometric or spectrophotometric instrument for the determination of hemoglobin, much of the inaccuracy of results is due primarily to the lack of a suitable reference standard for the calibration and daily control of these instruments, as well as the reagents and technique. Owing to the chemical complexity of blood and of the absorption spectrum of hemoglobin, it has been virtually impossible to devise an artificial standard that is wholly adequate.

The artificial standards used in clinical hemoglobinometry prior to the present invention are most generally color comparison standards which serve only to calibrate the photometer or spectrophotometer used in the analysis method and do not permit the standardization of the complete procedure. Other standards which have been used prior to the present invention are useful in connection only with one of the methods of hemoglobin analysis. That is, with one of the three most common methods of hemoglobinometry presently in use, which are the acid hematin, the oxyhemoglobin, and the cyanmethemoglobin methods of analysis.

One method for determining the hemoglobin content of blood is the oxyhemoglobin method referred to above and is illustrative of the clinical methods which are used. That is, with this method hemoglobin is converted to oxyhemoglobin by shaking blood with an excess of a solution of sodium carbonate. For example, 0.1 ml. of blood is added to 20 ml. of 0.1% solution of sodium carbonate; the blood is laked and the hemoglobin oxygenated by shaking the solution for a few seconds. The resultant clear solution in which theoretically all the hemoglobin is converted to oxyhemoglobin is read in a photoelectric colorimeter using a filter that approximates the major absorption zone of oxyhemoglobin. The oxyhemoglobin method of determining the hemoglobin content of blood is simple, rapid and accurate. The fading of the solution is avoided by diluting the oxyhemoglobin solution with ammonium hydroxide, for example. The cyanmethemoglobin method for the routine measurement of hemoglobin offers certain advantages over the oxyhemoglobin method and is carried out, for example, by converting the hemoglobin pigments to the cyanide complex of the oxidized form.

In each of the above methods and in other similar methods, the hemoglobin content is determined by a measurement of the light absorbance of the hemoglobin complex at a particular wave length of light using a colorimeter or spectrophotometer. The actual concentration of hemoglobin is made by comparison to a standard curve in which grams of hemoglobin per 100 ml. are plotted on a graph against the measured light absorbance. Hitherto, these plots were prepared from absorbance measurements of artificially colored solutions, glass or plastic tubes, which when placed in the instrument theoretically approximate the absorbance of a particular hemoglobin concentration. Knowing the given concentration and determining the absorbance the standard curve could then be plotted. However, these artificial standards are highly inaccurate and can only be used for a particular instrument employing the specific method for which it was designed. At best these artificial standards can only be used to calibrate the instrument. They are not internal standards and do not go through each step of the procedure as does the unknown specimen. This is most important, since the photometer is not the only source of error. Also involved are the pipettes, curvettes, chemical reagents, technical and observational errors. The most important technical errors are those of sampling and pipetting. The artificial standards of the prior art are not only inadequate as standards but cannot be used to control the errors introduced during the processing of the unknown blood specimen.

Accordingly, it is an object of the present invention to provide a stabilized whole human blood hemoglobin standard.

It is another object of the present invention to provide a hemoglobin standard which is stabilized, useful for a long period of time, and does not require sterile technique.

It is a further object of the present invention to provide a stabilized accurately standardized human whole blood hemoglobin standard for clinical hemoglobinometry which can be used as an internal standard and a control.

Yet another object of the present invention is to provide an internal hemoglobin standard for use in clinical hemoglobinometry which can be used as a standard with any clinical method for determining hemoglobin employing any photometer or spectrophotometer.

The present invention comprises a human whole blood which is stabilized and is accurately standardized for use as an internal hemoglobin standard. The standard is prepared in accordance with the method of the present invention by performing steps upon human whole blood which ruptures and separates all hemoglobin in the blood from the cellular tissue in which it is contained. Preservatives are added and the cellular tissue is removed. The hemoglobin content is then adjusted to a known concentration by dilution with various chemical compounds which do not affect the clinical analysis of the blood. The material so obtained with a known hemoglobin content is then utilized as a standard and a control for checking each step of the hemoglobin analysis of an unknown sample by any of the commonly employed methods of hemoglobinometry.

The novel features which are believed to be characteristic of the invention will be better understood from the following description in which a presently preferred embodiment of the invention is illustrated by way of example.

A stabilized hemoglobin standardized human whole blood is prepared in accordance with the present invention by the method which includes the steps of alternately freezing and thawing whole blood to rupture and destroy the cellular construction of the blood. That is, whole blood is refrigerated for twenty-four hours, at a temperature below the freezing point of blood, for example, at —40° F. The blood is then thawed to room temperature. The freezing and thawing steps are repeated, for example, a total of three times, until all cellular tissues have been ruptured. The blood after the final thawing is shaken and mixed thoroughly. The alternate freezing and thawing of the blood releases the hemoglobin into solution. Prior to freezing, the hemoglobin in the blood was contained within cellular tissue which is ruptured by the freezing and thawing steps to break down all cellular structure. The length of time required to thaw the sample is dependent upon the quantity of the sample, however, a thawing period of approximately twelve hours allows cell rupture without destroying any other constituents in the blood. A mixing step then assured that all constituents in the sample are disbursed to give a uniform material.

A preservative is then added to eliminate bacterial growth which will otherwise occur since bacteria are introduced during processing and by syringes inserted into the material when it is used for standardization. The preservative which is added must be such that it eliminates bacterial growth without interfering with the methods used for determining the hemoglobin content. The preservative is used at a bacteriacidal concentration, so that aseptic technique is not necessary and non-sterile syringes may be introduced into the standard without fear of bacterial contamination with subsequent change of the known concentration. Further, the high concentration of the bacteriacide does not cause side reactions with the analysis by any of the commonly employed methods. In the presently preferred embodiment thimerosal which is a mercury compound, manufactured under the trademark "merthiolate," is used as a preservative agent at the abnormally high concentration of 1:3000. Other suitable preservatives are, for example, cetyl dimethyl benzyl ammonium chloride or a mixture of methyl and propyl esters of p-hydroxy benzoic acids. The blood is then filtered to remove all cellular tissue and yields a clear solution. In the presently preferred embodiment the blood is filtered through glass wool and the filtration is repeated five or six times until all cellular tissue is removed. A preliminary determination of the hemoglobin concentration in a sample is made by any one of the classic methods such as described hereinbefore, i.e., the cyanmethemoglobin or oxyhemoglobin methods. After the preliminary determination has been made, the concentration of the hemoglobin is adjusted to a desired concentration by dilution. In the presently preferred embodiment 16.6 grams per 10 ml. of hemoglobin is utilized as a standard and the sample is diluted to approximately this concentration. The diluent which is used is such that it will not affect the analysis, for example, approximately 13.20 grams sodium citrate, 13.37 grams of anhydrous dextrose and 4.8 grams of citric acid are made up to obtain 1000 ml. of diluent. Other suitable diluents are water and phosphate buffer having a pH of 7.2. The proper amount of diluent is then mixed with the bulk material so a hemoglobin concentration of approximately 16.6 grams per 100 ml. is obtained. An exact determination of the hemoglobin concentration of the diluted material is then obtained, preferably by several independent replicate analysis utilizing the Wong Iron (an indirect method but highly accurate), the cyanmethemoglobin and oxyhemoglobin methods of analysis, so that the value resulting is within 1% of the true value based on 99% probability. The concentration of hemoglobin is thus accurately determined for use as an internal standard in the various steps of hemoglobinometry. The standard is then packaged in a sealed condition so that evaporation and drying do not occur to change the hemoglobin concentration.

The hemoglobin internal control standard obtained by the method described above can then be utilized for obtaining a standard curve for calibration of the photometer or colorimeter used in the hemoglobin analysis. In addition, since the standard has an accurately known value, and corresponds to the blood being analyzed, it can be employed to check for error in the clinical method being used, by going through every step of the technique.

In utilizing the internal whole blood standard obtained in accordance with this invention for the preparation of a standard curve, the standard is pipetted and diluted by adding the desired amount of water into a five ml. serologic test tube. The standard is removed from the sealed vial with a nonsterile dry tuberculin syringe and placed in a test tube using chemically clean, dry pipettes. The standard is pipetted into the distilled water and washed out three times into the solution. This is done by asperating the solution into the pipette and allowing it to drain back into the tube. The dilute standards may then be used as if they were blood specimens in the desired hemoglobin method, since the exact dilution of the standard with a known value will result in a second solution which is also of known value. For example, if 0.1 and 0.2 ml. of the standard with a value of 16.6 grams per 100 ml. are diluted with 0.2 and 0.1 ml. of water respectively, dilute solutions with calculated values of 5.55 and 11.1 grams per 100 ml. respectively are obtained.

The hemoglobin concentration from 0 to 20 grams per cent is placed on the horizontal axis and the optical density values on the vertical axis of linear co-ordinate paper. Optical density values are obtained by means of the photometer and are plotted against their corresponding calculated grams percent hemoglobin of the standard. A line connecting the values from the diluted and non-diluted standards should be linear and pass through zero.

Daily accuracy can be maintained by using the standard as a control against error. Here, it is only necessary to utilize the standard as a specimen with a known value. Values deviating less than plus or minus 2% from the stated hemoglobin value should be obtained. If larger deviations occur, the technique, instrument, glassware, or reagents are faulty.

Therefore, the present invention provides a stabilized, precisely standardized, human whole blood hemoglobin standard having a known hemoglobin content which has been determined by a replicate analysis utilizing various methods for optimum accuracy. The standard is usable throughout clinical hemoglobinometry as a control standard of know value and in the preparation of standard curve for calibration of the photometer or colorimeter used in such methods. In addition, the method and means described herein can also be utilized for the preservation of abnormal hemoglobin to be used in a similar manner. Thus, the abnormal hemoglobin can be preserved and distributed later as an abnormal hemoglobin standard. The standard has a usable stable life measured in months, does not require aseptic technique, and is useful in any hemoglobinometry method which may be chosen for analysis.

What is claimed is:

1. The method of preparing a stabilized whole blood which is standardized for use as a hemoglobin standard comprising the steps of: alternately freezing and thawing a blood sample to rupture and separate the hemoglobin in a blood sample from the cellular tissue in which said hemoglobin is contained; adding preservative to said sample; removing the cellular tissue from said sample; and adjusting the hemoglobin content of said sample to a known concentration by dilution with chemical compounds which do not affect the chemical analysis of the blood, whereby said sample of known concentration can be utilized as an internal standard and control in the hemoglobin analysis of an unknown sample by clinical methods.

2. The method of preparing a stabilized human whole blood in liquid form which is standardized for use as an internal hemoglobin standard comprising the steps of: alternately freezing and thawing a blood sample to rupture and separate the hemoglobin in a blood sample from the cellular tissue in which said hemoglobin is contained; adding preservative to said sample; said preservative being adapted to eliminate bacterial growth without interfering with analysis for determining hemoglobin content of said sample; removing the cellular tissue from said sample; and adjusting the hemoglobin content of said sample to a known concentration by dilution with chemical compounds which do not affect the chemical analysis of the blood, whereby said sample of known concentration can be utilized as an internal standard and control in the hemoglobin analysis of an unknown sample by clinical methods.

3. The method of preparing a stabilized human whole blood in liquid form which is standardized for use as an internal hemoglobin standard comprising the steps of: alternately freezing and thawing a blood sample to rupture and separate the hemoglobin in a blood sample from the cellular tissue in which said hemoglobin is contained; adding preservative to said sample; said preservative being adapted to eliminate bacterial growth without interfering with analysis for determining hemoglobin content of said sample; filtering the sample to remove cellular tissue from said sample, and adjusting the hemoglobin content of said sample to a known concentration by dilution with chemical compounds which do not affect the chemical analysis of blood, whereby said sample of known concentration can be utilized as an internal standard and control in the hemoglobin analysis of an unknown sample by clinical methods.

4. The method of accurately determining and stabilizing the concentration of hemoglobin in a liquid sample of human whole blood to be used as an internal standard in the hemoglobin analysis of an unknown sample of human blood comprising: alternately freezing and thawing a blood sample to rupture and separate the hemoglobin in a blood sample from the cellular tissue in which said hemoglobin is contained; adding preservative to said sample, said preservative being adapted to eliminate bacterial growth without interfering with analysis for determining hemoglobin content of said sample; filtering said sample to remove cellular tissue therefrom; adjusting the hemoglobin content of said sample to a known hemoglobin concentration by dilution with chemical compounds which do not affect the chemical analysis of blood; and sealing said known sample to prevent evaporation thereof, whereby said known sample can be utilized as an internal standard and control to check the hemoglobin analysis of an unknown human blood sample by globinometry methods.

References Cited in the file of this patent

UNITED STATES PATENTS

| | | |
|---|---|---|
| 2,527,210 | Bower | Oct. 24, 1950 |
| 2,770,602 | Weichselbaum | Nov. 13, 1956 |